Dec. 2, 1969　　　E. A. MILLER　　　3,481,557
MASON'S LINE REEL
Filed Dec. 22, 1967
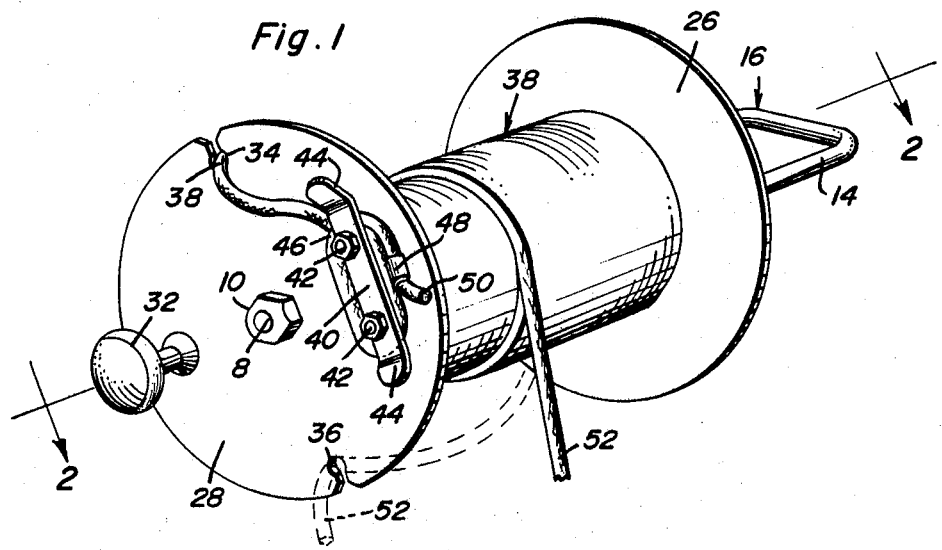
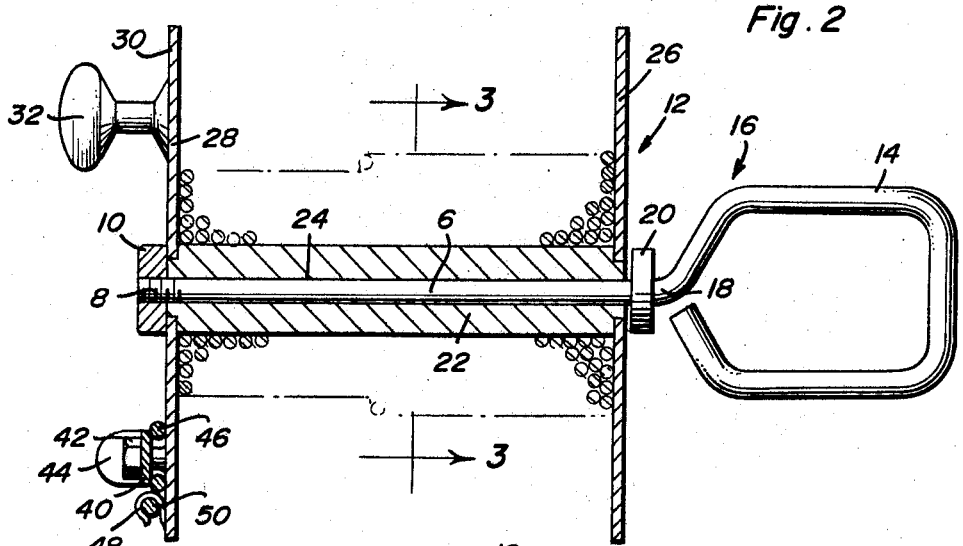
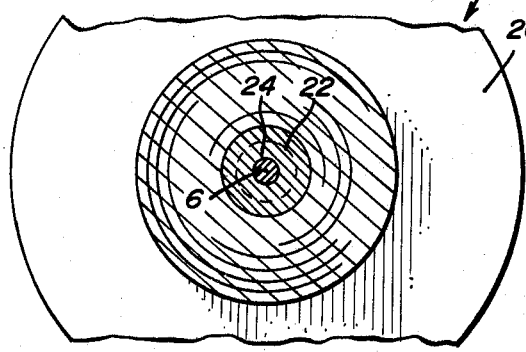
Eli A. Miller
INVENTOR.

ively and simply constructed and is practical and efficient for the purpose for which it has been designed.

United States Patent Office
3,481,557
Patented Dec. 2, 1969

3,481,557
MASON'S LINE REEL
Eli A. Miller, Box 15A, Rte. 1,
Millersburg, Ind. 46543
Filed Dec. 22, 1967, Ser. No. 693,021
Int. Cl. B65h 75/28
U.S. Cl. 242—96          5 Claims

ABSTRACT OF THE DISCLOSURE

A reel for paying out and reeling in a mason's line. A rod is formed at one end into a spool mounting shaft. The other end is formed into an easy-to-use handle. A knob is turned with one hand while the handle is held with the other hand. The knob-equipped head has keyhole-shaped notches or kerfs and is also provided with a line anchoring cleat having a complemental hooked clip which provides a holddown keeper for that end of the line which is looped (one turn for example) around the cleat and then clipped to the spool head by said keeper.

---

This invention relates to certain new and advantageous improvements in a reel which lends itself to use by a mason and which, broadly stated, is characterized by a shaft having a handle at one end of the shaft and a simple and practical line storing spool mounted for rotation on the shaft.

Briefly, the straight portion of a length of rod forms the shaft and an end portion of the rod is bent upon itself and fashioned into a compact and convenient handle. The spool comprises a hub-like sleeve with disk-type line spooling and confining heads at its respective ends. One head is provided with an easy-to-use spool turning and line winding knob and is also provided with line seating kerfs or notches and, in addition, with an anchoring cleat and a hook-type clip which serves as a keeper for the free terminal end of the line.

One improvement has to do with the simple rod formed into the shaft and handle. The other improvement pertains to the spool, more particularly, a sleeve-type hub with disk heads at its ends and with marginal line seating kerfs, a turning knob, and a unique anchoring cleat for the anchorable end of the mason's line.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a mason's line reel constructed in accordance with the principles of the invention and showing the manner in which it can be and is satisfactorily usable.

FIG. 2 is an enlarged view with parts in section and elevation taken approximately on the plane of the central section line 2—2 of FIG. 1 looking in the direction of the arrows.

FIG. 3 is a fragmentary cross-section on the plane of the section line 3—3 of FIG. 2.

By way of introduction to the description of the details it is to be pointed out that the invention was expressly designed and adapted for use by masons and others who are called upon to compactly and conveniently store a line in the manner illustrated in FIG. 1. It should be understood, however, that the invention lends itself to use in storing, paying out and reeling in a line other than a mason's line.

One component part or unit of the over-all structure is preferably, but not necessarily, constructed from a length of bendable rod stock. The straight portion of the rod, denoted at 6 provides a shaft one end of which is screw threaded as at 8 to accommodate an assembling and retaining nut 10 for the freely rotatable attachable and detachable spool 12. The other end portion of the rod is bent upon itself and fashioned into a generally rectangular loop 14 which provides a satisfactory handle 16. The junctional portion 18 between the handle and shaft is provided with a fixed washer 20 which constitutes a limit stop or shoulder which functions in the manner shown in FIG. 2.

The spool comprises a sleeve 22 which may be of wood or appropriate material and which provides a hub functioning in the manner illustrated in FIG. 2. This is to say the shaft 6 extends through the bore 24 in a manner that one end portion of the hub is rotatable against the limit stop washer 20 while the other end is rotatable against the assembling nut 10. The reduced end portions of this hub are provided with flat-faced disk-like heads one of which is denoted by the numeral 26 and the other one by the numeral 28. One marginal portion 30 of the head 28 is provided with a fixed eccentric outstanding turning knob 32. Diametrically opposite portions are provided with keyhole-shaped notches or line seating kerfs 34 and 36. The mason's line is denoted by the numeral 38. The anchorable end of the line is preferably anchored and held in place in the manner shown in FIG. 1. To this end it will be seen that an end portion 38 is passed through and seated in the notch or kerf 34. An elongated cleat of suitable length and dimension is provided at 40 and is bolted in place at 42 and is provided at its ends with outwardly flared end portions 44 spaced from the cooperating surface of the head 28. With this construction and arrangement an end portion of the line is looped around the bolts and held partly in place by the cleat 40 as denoted at 46. For best results a hook-shaped holddown clip is provided at 48 and the terminal end 50 of the line is releasably connected with the hook in the manner shown in FIG. 1 and more particularly at the left in FIG. 2. The usable end portion 52 of the line is coiled or wound on the hub between the heads 26 and 28 in the usual manner. In practice this end portion is paid out and employed in the regular manner of a mason's line and to prevent undesirable unwinding and to prevent tangling a portion of the line is seated and releasably retained as shown in phantom lines in the keeper notch or kerf 36.

In practice the handle 16 is held in one hand and the line 52 is paid out for use with the other hand. Then when it is desired to rewind and store the line, the knob 32 is turned to take up the line and store the same in a self-evident manner.

The construction of the rod unit characterized by the shaft 6 and handle means 16 is clearly evident from the views of the drawing. Likewise the construction of the spool 12 and the manner in which it is mounted and is turnable and used is clear and should be understood. It follows that the invention well serves the purposes for which it has been devised and is being advantageously and successfully used. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:
1. A mason's line reel construction comprising, in combination, a shaft having a handle at one end, a spool embodying an axial hub mounted for free rotation on said shaft, complemental and second heads affixed to the respective ends of said hub, said first head being proximal to said handle, said second head being provided with an eccentrically located knob providing a handgrip for turning the spool with one hand while gripping and holding said handle with the other hand, and anchoring means for a free end of the reelable mason's line, and means being disposed for readily accessible use on an exterior surface of said second head, said anchoring means embodying a line end looping cleat fixed eccentrically on said exterior surface, and further embodying a hook-shaped keeper which is fixed on said surface adjacent a coacting marginal edge of said cleat with which a free terminal end of said line is releasably connectible, said second head being provided with a first line seating kerf which is cooperable with said cleat and keeper, respectively.

2. The reel construction defined in and according to claim 1, and wherein said one end of said shaft is provided adjacent said handle with a fixed washer providing a spool positioning limit stop, the end of the hub adjacent said washer having abutting but rotatable contact with said limit stop, the other end of said shaft being free and screw threaded, and a spool positioning and assembling nut screwed on said screw-threaded end and retaining the spool in its given place between said nut and limit stop washer, respectively.

3. The reel construction defined in and according to claim 1, and wherein said second head is provided with a second line seating kerf, said kerfs being spaced circumferentially, said second head being of disk-like form and said kerfs opening outwardly through marginal edge portions of said head.

4. The reel construction defined in and according to claim 3, and wherein said kerfs are diametrically opposite each other and said knob is diametrically opposite said cleat.

5. A mason's line reel comprising, in combination, a rod having a straight portion providing a shaft and a terminating bent portion at one end of the straight portion fashioned into and providing a handle, the other end of said straight portion being screw threaded, a washer fixed to said one end of the straight portion inwardly of but adjacent said handle and providing a limit stop, a spool comprising a sleeve mounted for free rotation on said shaft between said stop washer and said screw-threaded end and removably but rotatably held in place by an assembling and retaining nut screwed on said screw-threaded end, said sleeve being provided at its ends with first and second disk-like line confining and reeling heads, said second head having an eccentric spool turning knob, anchoring means for one end of a mason's line mounted for readily accessible usage on an exterior surface of said second head, said anchoring means comprising a fixed cleat having outwardly flared free ends to assist in looping and end portion of the line around the cleat, a hook-shaped clip complemental to said cleat and providing a keeper with which a free terminal end of said line is manually releasably connectible, said second head being provided with a pair of diametrically opposite keyhole-shaped kerfs opening outwardly through coacting marginal edge portions of said second head.

References Cited

UNITED STATES PATENTS

| | | | |
|---|---|---|---|
| 1,408,261 | 2/1922 | Brookhart | 242—125.2 X |
| 1,687,579 | 10/1928 | McMullan | 242—125.1 X |
| 1,868,408 | 7/1932 | Clinton | 242—125.2 |
| 1,944,669 | 1/1934 | Purdy | 242—96 |
| 2,339,311 | 1/1944 | Young | 242—96 |
| 2,438,143 | 3/1948 | Brown. | |
| 2,846,162 | 8/1958 | Allin et al. | 242—125.1 X |
| 3,051,446 | 8/1962 | Nelson et al. | 242—125.1 X |
| 3,062,476 | 11/1962 | Crooks | 242—96 |

FOREIGN PATENTS

| | | |
|---|---|---|
| 151,096 | 9/1920 | Great Britain. |

NATHAN L. MINTZ, Primary Examiner